United States Patent
Golbs et al.

(10) Patent No.: US 9,266,424 B2
(45) Date of Patent: Feb. 23, 2016

(54) DRIVE ASSEMBLY, IN PARTICULAR FOR A CONSTRUCTION MACHINE, A SUBASSEMBLY FOR A DRIVE ASSEMBLY AND A CONSTRUCTION MACHINE COMPRISING THE SAME

(71) Applicant: Hamm AG, Tirschenreuth (DE)

(72) Inventors: Markus Golbs, Weiden (DE); Michael Zimmerer, Immenreuth (DE)

(73) Assignee: HAMM AG, Tirschenreuth (DE)

( * ) Notice: Subject to any disclaimer, the term of this patent is extended or adjusted under 35 U.S.C. 154(b) by 0 days.

(21) Appl. No.: 14/472,899

(22) Filed: Aug. 29, 2014

(65) Prior Publication Data

US 2015/0060184 A1    Mar. 5, 2015

(30) Foreign Application Priority Data

Aug. 30, 2013 (DE) .......................... 10 2013 217 368

(51) Int. Cl.
*B60K 11/04* (2006.01)
*B60K 5/12* (2006.01)
*B60K 13/04* (2006.01)
*E02D 3/02* (2006.01)

(52) U.S. Cl.
CPC ............... *B60K 11/04* (2013.01); *B60K 5/1208* (2013.01); *B60K 13/04* (2013.01); *E02D 3/02* (2013.01)

(58) Field of Classification Search
CPC ............................... B60K 5/1283; B60K 5/12
USPC ......................................... 180/298, 299, 68.4
See application file for complete search history.

(56) References Cited

U.S. PATENT DOCUMENTS

| | | | | |
|---|---|---|---|---|
| 5,740,876 A | * | 4/1998 | Shimose et al. | 180/232 |
| 5,833,514 A | * | 11/1998 | Eaton | 446/462 |
| 5,992,555 A | * | 11/1999 | Sakamoto et al. | 180/232 |
| 6,408,969 B1 | | 6/2002 | Lobert et al. | |
| 6,880,656 B2 | * | 4/2005 | Pfusterschmid et al. | 180/68.4 |
| 7,089,994 B2 | * | 8/2006 | Esposito et al. | 165/42 |
| 7,445,076 B2 | * | 11/2008 | Shigematsu | 180/299 |
| 7,588,117 B2 | * | 9/2009 | Fukuda | 180/291 |
| 7,617,903 B2 | * | 11/2009 | Byers et al. | 180/291 |
| 7,938,215 B2 | * | 5/2011 | Leconte | 180/68.4 |
| 8,453,776 B2 | * | 6/2013 | Neilson | 180/68.1 |

(Continued)

FOREIGN PATENT DOCUMENTS

| | | |
|---|---|---|
| DE | 298 05 539 U1 | 6/1998 |
| DE | 102 06 551 A1 | 9/2003 |

(Continued)

OTHER PUBLICATIONS

Search report issued for related German application No. 10 2013 217 368.7 mailed May 27, 2014, 10 pages.

(Continued)

*Primary Examiner* — Jeffrey J Restifo
(74) *Attorney, Agent, or Firm* — Rothwell, Figg, Ernst & Manbeck, P.C.

(57) ABSTRACT

A drive assembly, in particular for a construction machine, comprising a drive unit having a plurality of first fastening regions for the attachment to a machine frame and at least one functional unit that interacts with the drive unit, and a functional unit carrier assigned to said drive unit, is characterized in that the functional unit carrier can be swiveled around at least one swivel axis with respect to the drive unit in a swivel connection region.

21 Claims, 5 Drawing Sheets

(56) References Cited

U.S. PATENT DOCUMENTS

| | | | |
|---|---|---|---|
| 8,511,416 B2* | 8/2013 | Hiruma | 180/299 |
| 8,544,584 B2* | 10/2013 | Takeda et al. | 180/68.1 |
| 8,672,071 B2* | 3/2014 | Neilson | 180/68.1 |
| 8,770,329 B2* | 7/2014 | Spitler | 180/68.4 |
| 8,851,223 B2* | 10/2014 | Yamashita et al. | 180/291 |
| 8,960,342 B2* | 2/2015 | Werner et al. | 180/68.1 |
| 2002/0096384 A1* | 7/2002 | Yoshida et al. | 180/298 |
| 2003/0168269 A1* | 9/2003 | Pfusterschmid et al. | 180/68.4 |
| 2007/0051549 A1* | 3/2007 | Fukuda | 180/232 |
| 2009/0078394 A1 | 3/2009 | Weatherup | |
| 2012/0138379 A1 | 6/2012 | Tsuji et al. | |
| 2013/0305717 A1 | 11/2013 | Roehr et al. | |
| 2015/0060184 A1* | 3/2015 | Golbs et al. | 180/309 |

FOREIGN PATENT DOCUMENTS

| | | |
|---|---|---|
| DE | 10351339 A1 | 6/2005 |
| DE | 10 2008 019 864 A1 | 1/2009 |
| DE | 102009015414 A1 | 9/2010 |
| EP | 1 968 813 A2 | 9/2008 |
| WO | 2007/040820 A1 | 4/2007 |
| WO | 2007/077491 A2 | 7/2007 |
| WO | 2011/007235 A1 | 1/2011 |
| WO | 2011/058974 A1 | 5/2011 |

OTHER PUBLICATIONS

European Search Report issued for European patent application No. 14182276.7 dated Apr. 30, 2015 along with machine Engiish translation (18 pages).

* cited by examiner

DRIVE ASSEMBLY, IN PARTICULAR FOR A CONSTRUCTION MACHINE, A SUBASSEMBLY FOR A DRIVE ASSEMBLY AND A CONSTRUCTION MACHINE COMPRISING THE SAME

RELATED APPLICATION DATA

Pursuant to 35 U.S.C. §119, this application claims priority to German Patent Application No. 10 2013 217 368.7, filed Aug. 30, 2013, the entire contents of which are incorporated herein by reference.

BACKGROUND

1. Field of the Invention

The present invention relates to a drive assembly, in particular for a construction machine, comprising a drive unit with a plurality of first fastening areas for fixation to a machine frame and at least one functional unit that interacts with the drive unit, and a functional unit carrier that is assigned to said functional unit. Furthermore, the present invention relates to a subassembly that can preferentially be used in a drive assembly of this kind, as well as a construction machine comprising this type of drive assembly, or, as the case may be, subassembly.

2. Background of the Invention

From DE 10 2011 005 275 A1, a construction machine is known that is designed as a self-propelled soil compactor. A drive assembly of this construction machine comprises a turbocharged diesel drive unit as a central system region, to which a functional unit provided in the form of a cooler arrangement for the drive unit is attached to the drive unit by means of a functional unit carrier designed as a pre-assembly frame. The drive assembly, which is constructed having additional system regions, such as, for example, an exhaust gas routing system, is fixed in its entirety to a machine frame.

Drive assemblies designed in particular as internal combustion engines often lead to vibrational responses that generate high mechanical and acoustic stress due to the periodically occurring ignitions and the translational motions they cause, or, as the case may be, also the rotary motion of various components thereof. In order to counteract this, it is known practice to fix drive assemblies of this type above fastening regions on the machine frame that have a dampening or elastic effect. It is also known practice to provide connecting elements that have an elastic effect between various components or subassemblies of a drive assembly of this type. Whereas it is possible to produce a certain damping due to the damping properties of elastic elements of this kind, given an appropriate tuning, to the exciting frequencies, it is practically impossible to achieve a decoupling of vibrations or, as the case may be, a targeted frequency detuning of the interconnected components, or, as the case may be, of the subassemblies or of a drive assembly of this type in individual degrees of freedom of the total of six degrees of freedom (three translational and three rotational degrees of motion).

SUMMARY OF THE INVENTION

It is the object of the present invention to provide a drive assembly, in particular for a construction machine, a subassembly for a drive assembly and for a construction machine, by means of which an improved decoupling of vibration can be achieved with a design that can be easily realized and with a high resistance to mechanical stress.

According to a first aspect of the present invention, this object is attained by means of a drive assembly, in particular for a construction machine, comprising a drive unit with a plurality of first fastening areas for fixation to a machine frame and at least one functional unit that interacts with the drive unit and a functional unit carrier assigned to said functional unit.

It is also inventively provided that the functional unit carrier can be pivoted around at least one swivel axis with respect to the drive assembly in the region of a swivel connection.

The inventive construction of a drive assembly provides the possibility of accomplishing a rotary decoupling between the drive unit that primarily produces the vibrational responses and this functional unit carrier, or, as the case may be, the functional unit carried thereon by means of a swiveling, i.e. an articulated coupling of at least one functional unit carrier. This type of swivel connection generally has a high resistance to mechanical stress, and realizes, in contrast to damping elements, translational forced guidance, but it nonetheless involves only low frictional torques, and therefore results in significant vibration decoupling, by means of which an obvious reduction is achieved in the mechanical strain on the functional unit carrier, or, as the case may be, on the functional unit carried thereon, or, as the case may be, on the drive assembly itself.

In an advantageous embodiment, it is proposed that two functional units and the functional unit carriers assigned to them be provided, whereby at least one of the functional unit carriers can be swiveled around at least one swivel axis with respect to the drive assembly. If at least one, advantageously, however, both, or, as the case may be, all functional unit carriers can be swiveled, or, as the case may be, are coupled in an articulated manner, an obviously improved vibration decoupling, or, as the case may be, frequency detuning is achieved inside the drive assembly with a corresponding reduction in the mechanical strain on the system regions that are connected in this way.

In a particularly advantageous embodiment, it is proposed that a first functional unit carrier in a first swivel connection region can be connected to the drive assembly by swiveling around a first swivel axis and that a second functional unit carrier can be connected to the first functional unit carrier in a second swivel connection region by swiveling around a second swivel axis that is preferentially substantially parallel to a first swivel axis. With this construction, a chain of swiveling, or, as the case may be, articulated connections are set up, which leads to obviously better vibration decoupling of the system regions provided for therein.

In order to create a connection that is optimized with respect to the rotational degree of freedom in the region of the respective swivel connection, or, as the case may be, an articulated connection, it is proposed that at least one swivel connection region comprises at least one joint region with at least one, and preferentially two, and most preferentially three rotational degrees of freedom. A defined positioning, or, as the case may be, connection of a respective functional unit carrier can be ensured by at least one swivel connection region including two joint regions that are arranged at a distance from each other in the direction of a swivel axis of this swivel connection region. Even when this kind of connection comprises two joint regions arranged at a distance from each other, they can advantageously be designed such that they ensure swiveling in two or three degrees of rotational freedom, so that even deformations that occur in a respective functional unit carrier cannot lead to distortion, but rather to the possibility of a component coupled to being decoupled.

Then, advantageously, when two functional unit carriers are coupled to each other in the way described above, the first swivel connection region and/or the second swivel connection region comprises two joint regions. This means that in at least one of these two swivel connection regions there is a primary swivel axis, whereas, for example, the other swivel connection region can only be configured to have one joint region, and this one region having only three rotational degrees of freedom. In this case, as well, a defined positioning of a functional unit carrier coupled in this way is ensured.

In order to also ensure a stable connection of the functional units inside a construction machine or a similar machine to the drive assembly, it is proposed that on at least one functional unit carrier, preferentially the second functional unit carrier, at least one, and preferentially a plurality of second fastening regions are provided for fixation to a machine frame.

In the case of the previously described coupling of two functional unit carriers, it is further proposed, in order to maintain an intrinsically stable construction, that the second functional unit carrier is connected to the drive assembly in at least a third fastening region. In this instance, the two functional unit carriers can be provided within the framework of a subassembly that will be described below.

At least one fastening region can comprise at least one elastic fastening member. Such elastic fastening members are generally made of rubber-like material, which is therefore elastically deformable when subjected to mechanical stress. The deformation characteristics of said elastically deformable material, that is, for example its modulus of elasticity, can be adjusted to the vibrational responses to be anticipated in order to contribute in this way to improved vibration damping characteristics.

With the inventively constructed drive assembly, one functional unit can comprise an exhaust gas routing component, for example a muffler or, as the case may be, a particle filter for the drive unit. Furthermore, one functional unit can include a cooler arrangement for the drive unit in order to cool the coolant circulating inside said unit.

In order not to obstruct the relative movement of a respective functional unit carrier in relation to the drive assembly, which has, as discussed above, been facilitated in the region of a swivel connection, it is proposed that at least one functional unit interacts with the drive assembly via a flexible coupling arrangement, preferentially a line connection.

According to a further aspect, the previously described object is attained by means of a subassembly for a drive assembly, in particular with the inventive construction, comprising:

a drive unit carrier that is fixed to a drive unit,
a first functional unit carrier for a first functional unit for the drive assembly, wherein the first functional unit carrier has a swiveling connection to the drive unit carrier in the region of a first swivel connection,
a second functional unit carrier for a second functional unit for the drive assembly, wherein the second functional unit carrier has a swiveling connection to the first functional unit carrier in a second region of the swivel connection, and is connected in a fastening region to the drive unit carrier, preferentially by means of at least one elastic fastening member.

With a subassembly of this kind, it can be provided that at least one region of the swivel connection has at least one joint region with at least one, preferably two, and most preferably three degrees of rotational freedom.

A subassembly of this kind can, for example, also be pre-assembled along with the functional units that are to be carried on the respective functional unit carriers and then, for example, coupled by attaching the drive unit carrier to the drive assembly. If this connection is rigid, made for example by means of a screw connection, the drive unit carrier inside the drive assembly must then be considered as a system region of the drive unit in terms of vibration control engineering.

According to another aspect, the object cited above is attained by means of a construction machine, in particular a soil compactor, comprising a construction machine frame and an inventively constructed drive assembly that is preferentially provided with an inventively constructed subassembly. In this construction machine, the drive unit is fixed with the first fastening regions on the frame of the construction machine.

Furthermore, at least one functional unit carrier is attached to the frame of the construction machine with at least one second fastening region.

BRIEF DESCRIPTION OF THE DRAWINGS

The present invention will be described in detail below with reference to the attached figures. They show.

DETAILED DESCRIPTION OF THE PREFERRED EMBODIMENTS

Figure 1:
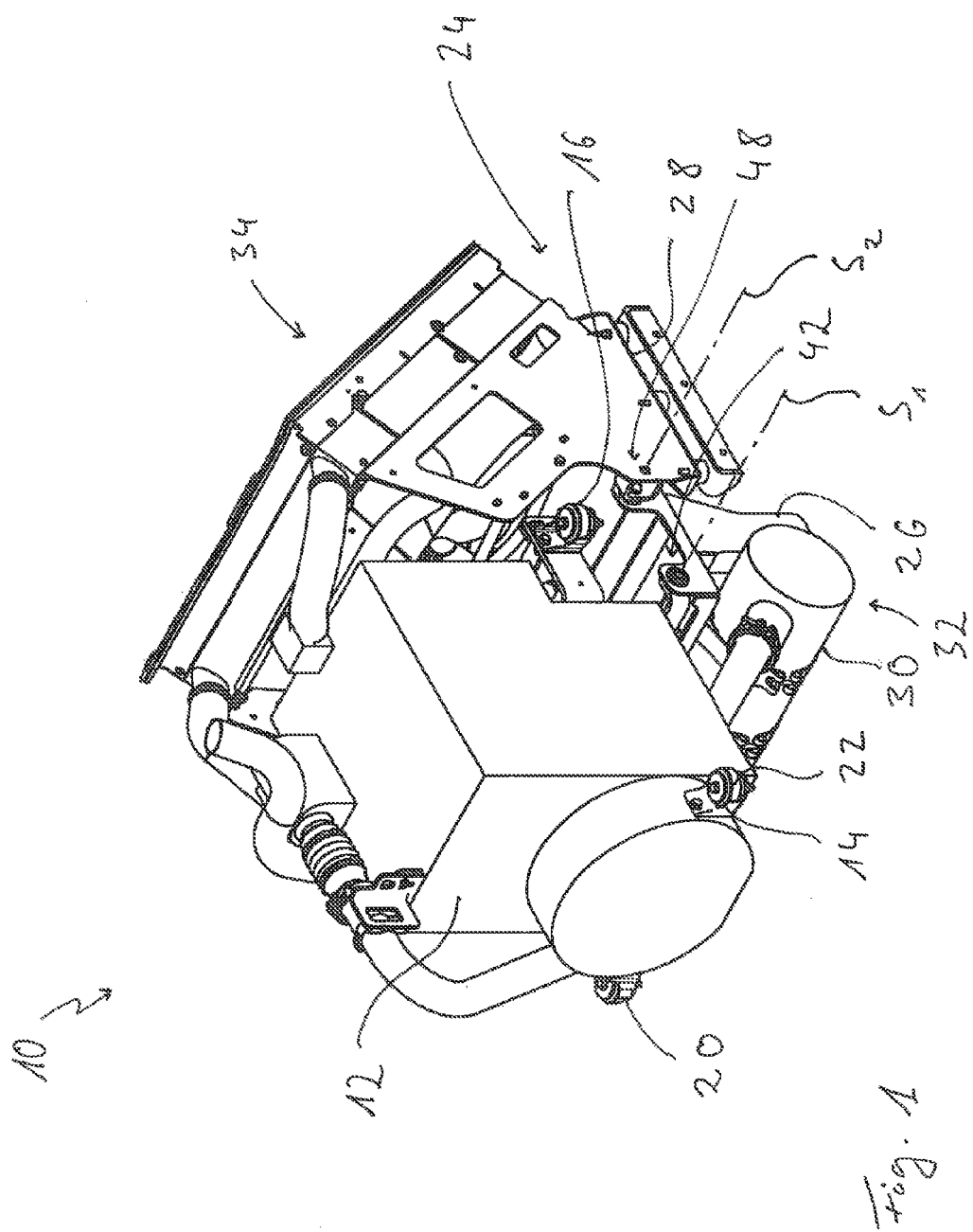
FIG. 1 is a perspective view of a drive assembly.
Figure 2:
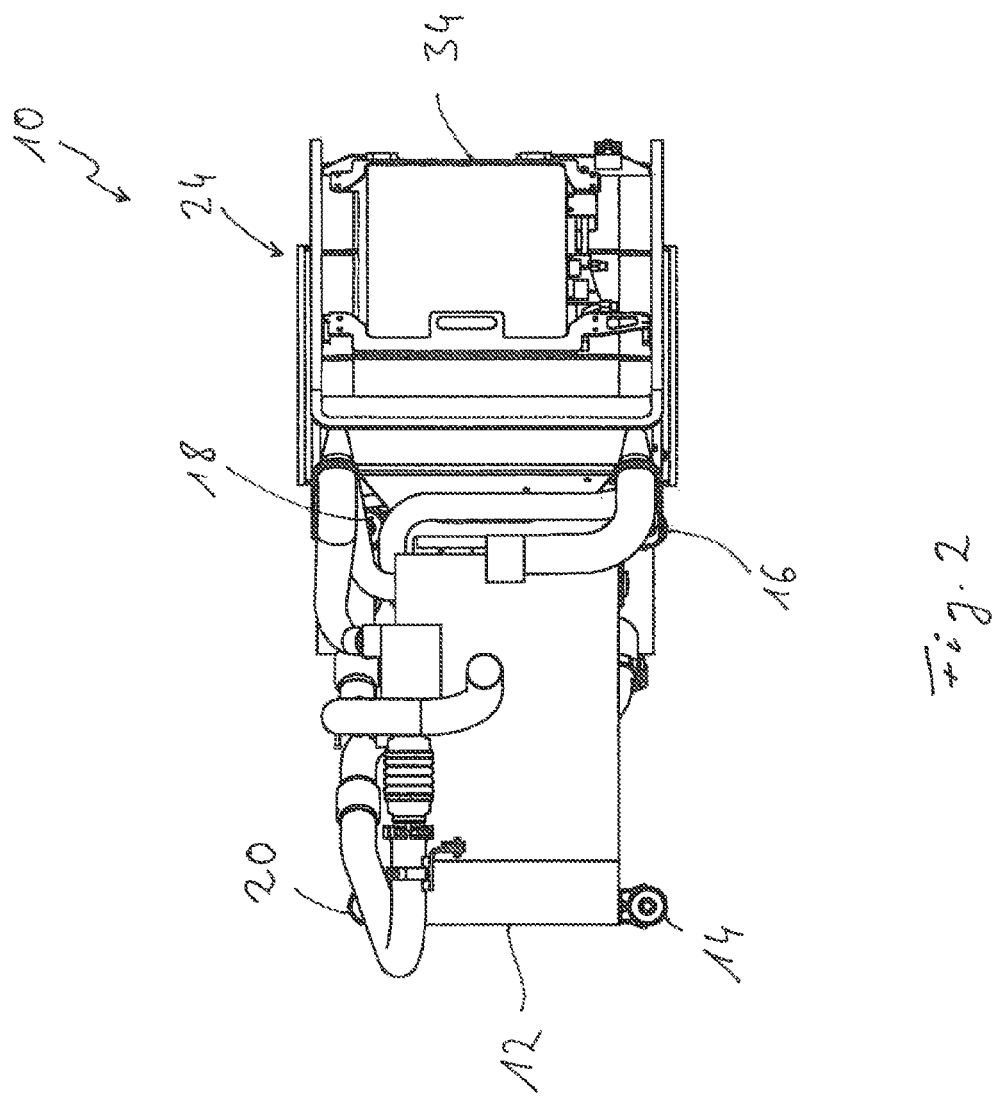
FIG. 2 is a top view of the drive assembly in FIG. 1.
Figure 3:
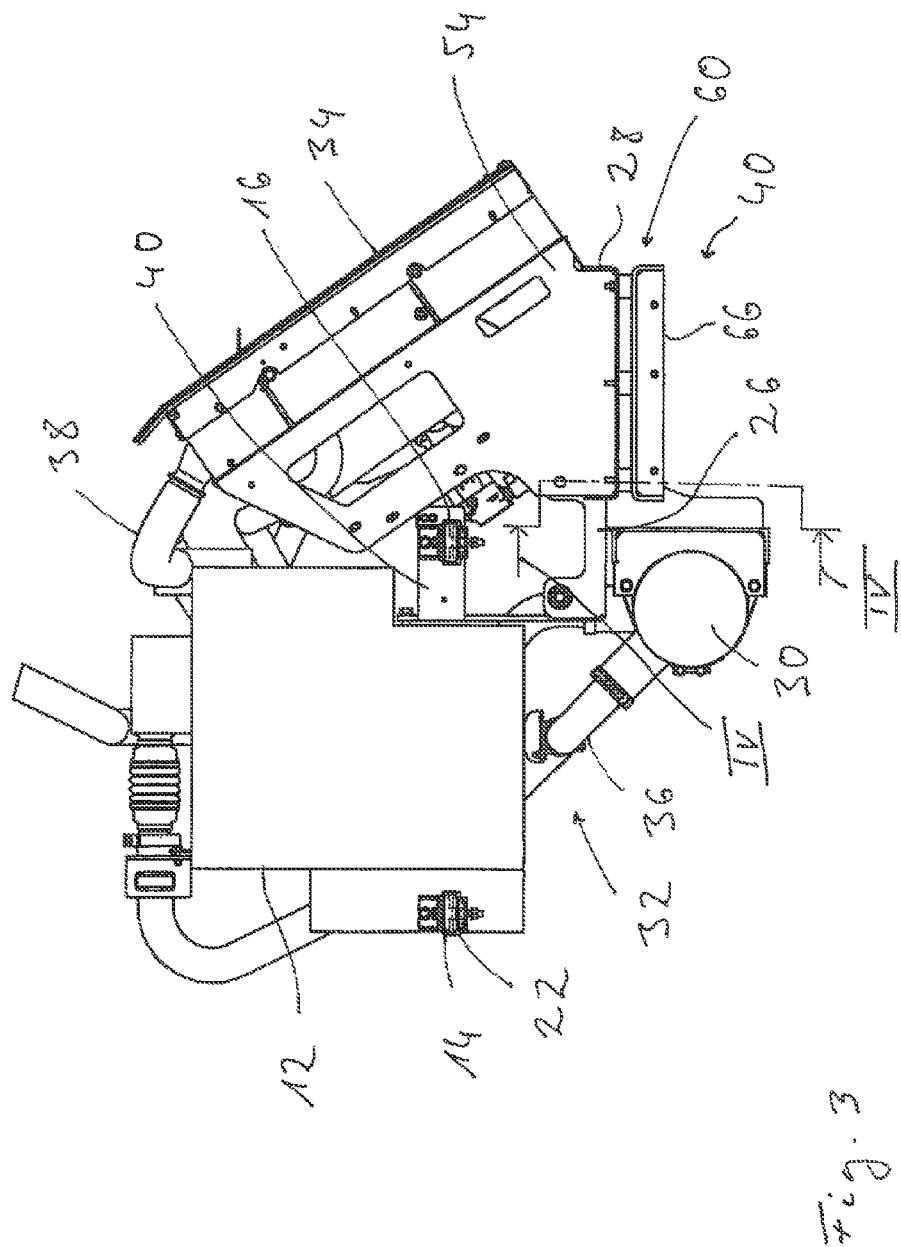
FIG. 3 is a side view of the drive assembly in FIG. 1.
Figure 4:
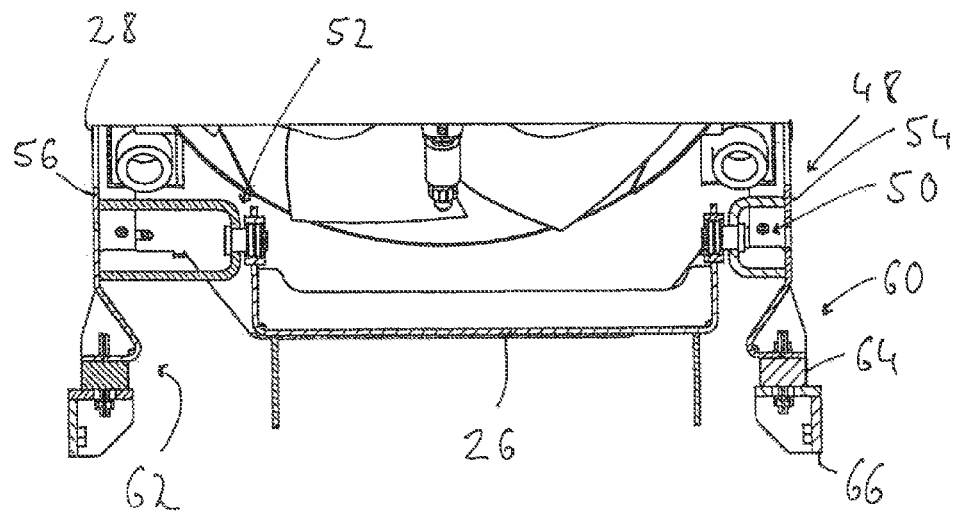
FIG. 4 is a partial cross-sectional view of the drive assembly in FIG. 1, cut along a line IV-IV in FIG. 3.

The drive assembly 10 for a construction machine, for example a self-propelled soil compactor that can be used in road construction, shown in a perspective view in FIG. 1, comprises a drive unit 12 as a central system region that is only shown schematically. This can, for example, be configured as a turbocharged diesel internal combustion engine. The drive power of the drive unit can, for example, be used to provide pressurized fluid in a hydraulic pump region, which is not shown in the figures, and that can then be used in various hydraulic engines to generate a drive torque.

The drive assembly 12 is to be fixed to a machine frame, not shown in the figures, of a construction machine of this type via a plurality of fastening regions 14, 16, 18, 20. In the example shown, these are four first fastening regions 14, 16, 18, 20, which are respectively positioned in corner regions of the drive assembly 12. In order to accomplish a vibration-free connection to the construction machine, each of these first fastening regions is preferentially configured with an elastic fastening member 22. The vibration damping characteristics of these elastic fastening members 22, which, on the one side, can be fastened using screws to the drive unit 12 and on the other side to the machine frame, can be adjusted to the vibration excitation spectrum generated during the operation of the drive unit in order to transmit as little vibration as possible to the machine frame.

Figure 5:
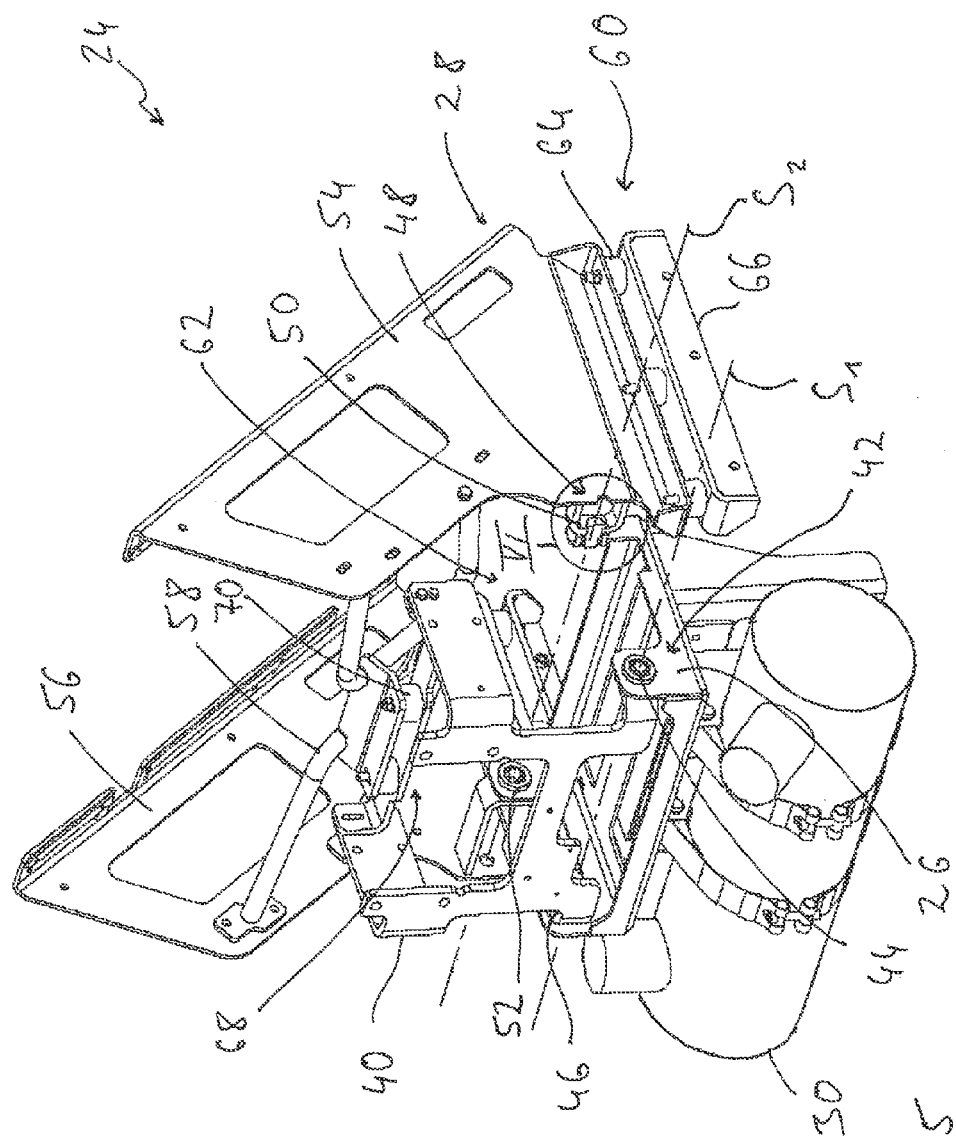
FIG. 5 is a perspective view of a subassembly of the drive assembly in FIG. 1.

As an additional component of the system region, the drive assembly 12 comprises a subassembly that is clearly shown in FIG. 5. This subassembly 24 comprises two functional unit carriers 26, 28 that are connected by swiveling to each other and with the drive assembly 12. A particle filter of an exhaust gas routing system, generally designated with 32, is attached to the functional unit carrier 26 as a functional unit 30 assigned to the drive assembly 12. A cooler arrangement for the coolant circulating in the drive assembly 12 is attached as a functional unit 34 to the second functional unit carrier 28. Both functional units 30, 34 are connected, with respect to the drive unit, via connecting lines 36 or, as the case may be, 38, which are flexible in at least some regions, and are thus functionally coupled to the drive assembly 12.

The subassembly 24 shown in FIG. 5 also comprises a drive unit carrier 40. This is, for example, to be firmly connected by means of screws to the drive assembly, or for example to an engine block thereof, and thus assigned to the drive assembly 12 in terms of vibration control engineering.

In a first swivel connection region, generally designated with 42, the drive unit 12, or, as the case may be, the drive unit carrier 40 that is to be attached thereto, is basically attached pivotable around the first swivel axis $S_1$ to the first functional unit carrier 26 by means of two joint regions 44, 46 arranged at a distance from each other in the direction of a first swivel axis $S_1$. In a second swivel connection region, generally designated as 48, the first functional unit carrier 26 is connected to the second functional unit carrier 28 pivotable around a second swivel axis $S_2$ which is preferentially essentially parallel to the first swivel axis $S_1$. The second swivel connection region 48 also includes two joint regions 50, 52 arranged at a distance from each other in the direction of the second swivel axis $S_2$.

As the figures show, the two swivel axes $S_1$ and $S_2$ are arranged such that they extend essentially transversely to the drive assembly 10. As the drive assembly 10 is generally installed in a construction machine such that the direction of its longest extension corresponds to the longitudinal direction of a construction machine of this type, the two swivel axes $S_1$ and $S_2$ thus essentially also extend transversely to the longitudinal direction of a construction machine of this type. In this case, these two swivel axes $S_1$ and $S_2$ can be positioned on approximately the same horizontal level.

The second functional unit carrier 28 can comprise two side frame regions 54, 56 that are constructed independently of each other, said regions being firmly connected to each other by means of, for example, a tubular connecting frame 58. On the second functional unit carrier 28, for example on each side frame region 54, 56 thereof, a respective second fastening region 60, 62 is provided, by means of which the second functional unit carrier 28 is to be attached to the machine frame, which is not shown, of a construction machine or the like. In this case, each second fastening region 60, 62 can be constructed such that it comprises one or a plurality of elastic fastening members 64. In the example shown, each second fastening region 60, 62 comprises three elastic fastening members 64 that are arranged consecutively in the longitudinal direction of the drive assembly. They can each be fixated with respect to the second functional unit carrier 28 and also to the machine frame by means of screws. In particular, the fastening members 64 of each second fastening region 60, 62 can be fastened to the machine frame via a common connection element 66. Due to the elasticity of the elastic fastening members 64 of the second fastening regions 60, 62, the vibration is damped in the fastening region where the second functional unit carrier 28 is attached to the machine frame, so that in this region, the vibrational responses generated in the drive assembly 12 are only transmitted to the machine frame in a significantly diminished manner. By way of example, in terms of construction and also with respect to their vibration damping characteristics, the fastening members 64 of the second fastening regions 14, 16, 18, 20 could correspond to the fastening members 22 of the first fastening regions 14, 16, 18, 20. Fundamentally, however, due to the different mass ratios found in the region of the second functional unit carrier 28, fastening members 64 that are adjusted to these different mass ratios and which are different from the fastening members 22 can be used.

The second functional unit carrier 28 is connected to the drive unit frame 40 in a third fastening region 68. The third fastening region 68 comprises a plurality, two in the shown example, of elastic fastening members 70 that can be attached on the one side with respect to the connecting frame 58, and thus to the second functional unit carrier 28, and on the other side with respect to the drive unit frame 40. For this purpose, plate-like components of the connecting frame 58 can be used on the one side, or of the drive unit carrier 40 on the other side.

The fastening members 70 of the third fastening region 68 elastically couple the second functional unit carrier 28 to the drive unit carrier 40, and thus also to the drive unit 12. As the first functional unit carrier 26 is in principle connected swiveling around the respective swivel axes $S_1$ and $S_2$ to both the drive unit carrier 40, and thus also to the drive unit 12, as well as to the second functional unit carrier 28, there is a rotatory decoupling of the first functional unit carrier 26, on the one side, with respect to the drive unit 12, and on the other side with respect to the second functional unit carrier 28 of the two system regions that are coupled in the first fastening regions 14, 16, 18, 20 on the one side, and in the second fastening regions 60, 62 on the other side, via respective elastic fastening members 22, or, as the case may be, 64, to the machine frame. This rotatory decoupling primarily applies to the swiveling movement that is made possible by the respective joint regions 44, 46, or, as the case may be, 50, 52 providing the respective swiveling connection. This in turn produces a substantial vibration decoupling of the first functional unit carrier 26 with respect to the drive unit 12 on the one side, and with respect to the second functional unit carrier 28 on the other side. The latter is in turn vibration-free with respect to the drive unit due to this double pivotable connection on the one side and the elastic connection in the third fastening region 68 on the other side.

The different functional unit carriers 26, 28 can be assembled from a plurality of components permanently joined together by means of welding or screwing or riveting or the like. However, carriers of this kind can also be provided as a single piece of material, for example by cutting or stamping and forming.

Figure 6:
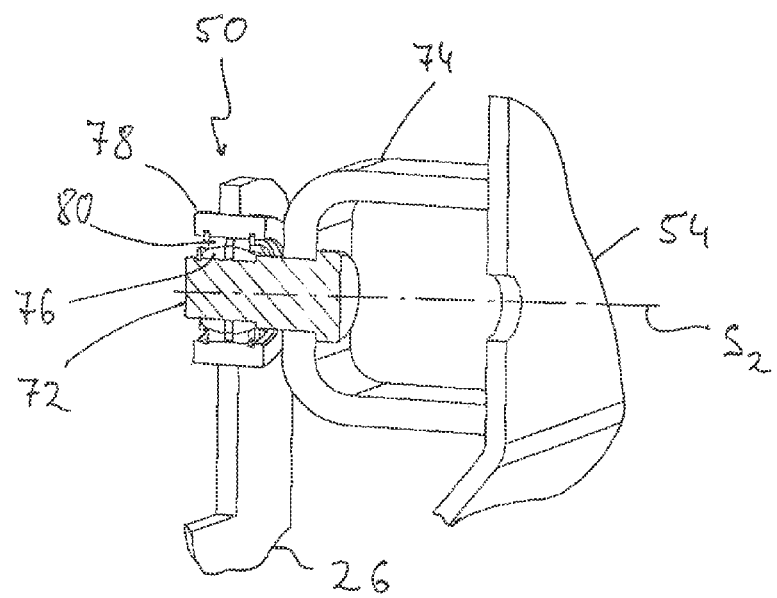
FIG. 6 is a detail of a cross-sectional view of a joint region of the drive assembly in FIG. 1 shown in Circle VI in FIG. 5.

FIG. 6 shows an example of a joint region. In particular, the joint region 50 of the second swivel connection region 48 is shown in FIG. 6. It should be pointed out that the other joint regions 44, 46 and 52 can also be constructed in the same way as the joint region 50 illustrated in FIG. 6.

The joint region 50 is basically constructed as a joint with three rotational degrees of freedom. A pivot bolt 72 is fastened to the side frame 54 of the second functional unit carrier 28, for example, by means of a U-shaped carrier 75. A joint ball 76 is permanently connected to the pivot bolt 72. Said joint ball can, be attached axially in the longitudinal direction of the bolt with respect to the joint bolt 72, and can also be connected torque-proof to said joint bolt. Fundamentally, the joint ball 76 could also be rotatable with respect to the joint bolt 72. A circular pivot joint housing 78 is firmly supported on the first functional unit carrier 26. In the pivot joint housing 78, a joint socket 80 surrounding the joint ball 76 is carried, for example, in a torque-proof and also in a non-displaceable manner. In principle, the joint socket 80 could also be rotatably accommodated in the pivot joint housing 78.

The joint socket 80 and the joint ball 76 interact in order to provide a ball joint. In particular, the joint ball 76 can rotate around the second swivel axis $S_2$ in the joint socket 80. Furthermore, swiveling in both horizontal and vertical direction is made possible, so that the joint ball 76 and the joint socket 80 can in principle rotate in all three orthogonally related spatial directions relative to each other, but only at a limited angle in at least two of these spatial directions.

Whereas a relative movement of the joint ball 76 with respect to the joint socket 80 around the second swivel axis $S_2$ essentially occurs when the first functional unit carrier 26 entirely swivels relative to the second functional unit carrier 28 around this second swivel axis $S_2$, the two other degrees of rotational freedom provided by the joint connections 44, 46, 50, 52 serve to produce a decoupling from the deformation movements caused in the individual components themselves, which are coupled in this way. Deformations of this kind can also occur due to vibrational responses that are provoked, for example, by periodic ignitions, or, as the case may be, rotary motions and linear motions inside the drive unit 12.

By means of the previously described vibration-related decoupling of various system regions of the drive assembly 10 by using at least one, and preferentially a plurality of swivel connection regions introducing degrees of rotational freedom, the transmission of vibration inside the drive assembly 10 is substantially reduced, so that particularly in the system regions that are decoupled from the drive unit 12, the strain due to vibrational responses is definitely reduced, and thus the risk of noises arising from vibrational responses is also reduced. The risk of transmitting vibrations via system regions that are decoupled in this way is also reduced.

It should also be pointed out that by utilizing the basic principle of the present invention, i.e. the articulated connection of system regions of a drive assembly 10, variations can be made to the previously described structure. By way of example, one of the swivel connection regions, for example the first joint connection region, could be configured only having a single joint region. As a result of the connection to an additional system region via two joint regions, in this case in the region of the second swivel connection region, a defined positioning of the system region in question, here for example the first functional unit carrier 26, is nevertheless guaranteed. Furthermore, it is also, of course, possible to design one or a plurality of the swivel connection regions, or, as the case may be, one or a plurality of the joint regions, such that it is possible to have not only a relative maneuverability with one or a plurality of degrees of rotational freedom, but also a translational relative movement of the system regions that are coupled in this way. Thus, for example, one or a plurality of the swivel connection regions, or, as the case may be, joint regions, could be configured such that in principle, movements with two degrees of rotational freedom and one degree of translational freedom are possible.

It should also be pointed out that the previously described connection with two swivel connection regions could also be replaced by a connection in which only one swivel connection region, for example the second swivel connection region, is provided, whereas in the first swivel connection region, the first functional unit carrier 26, for example, could be rigidly connected or connected via elastic fastening members to the drive unit 12, or, as the case may be, to the drive unit carrier 40. The drive unit carrier 40 could also be placed on the drive unit 12 by using elastic fastening members or elastic intermediate layers.

We claim:

1. A drive assembly for a construction machine, comprising:
   a drive unit having a plurality of first fastening regions to be attached to a machine frame;
   at least one functional unit that interacts with the drive unit; and
   a functional unit carrier assigned to said functional unit;
   wherein the functional unit carrier can be swiveled around at least one swivel axis with respect to the drive unit in a swivel connection region;
   wherein two functional units and functional unit carriers respectively assigned to them are provided, whereby at least one of the functional unit carriers can be swiveled around at least one swivel axis with respect to the drive unit; and
   wherein a first functional unit carrier is connected to the drive unit pivotable around a first swivel axis in a first swivel connection region, and a second functional unit carrier is connected to the first functional unit carrier pivotable around a second swivel axis in a second swivel connection region.

2. A drive assembly according to one of the claim 1, wherein at least one swivel connection region comprises at least one joint region with at least one rotational degree of freedom.

3. The drive assembly according to claim 2, wherein at least one swivel connection region comprises two joint regions arranged at a distance from each other in the direction of a swivel axis of this swivel connection region.

4. The drive assembly according to claim 1, wherein the first swivel connection region and/or the second swivel connection region comprise two joint regions.

5. A drive assembly according to claim 1, wherein on at least one functional unit carrier, at least one second fastening region is provided for attachment to a machine frame.

6. The drive assembly according to claim 1, wherein the second functional unit carrier is connected to the drive unit in at least a third fastening region.

7. A drive assembly according to claim 1, wherein at least one fastening region comprises at least one elastic fastening member.

8. A drive assembly according to claim 1, wherein a functional unit comprises an exhaust gas routing component for the drive unit and/or that a functional unit comprises a cooler arrangement for the drive unit.

9. A drive assembly according to claim 1, wherein at least one functional unit interacts with the drive unit via a flexible coupling arrangement.

10. A construction machine comprising a construction machine frame and a drive assembly according to claim 1, wherein the drive unit is attached with the first fastening regions to the construction machine frame and at least one functional unit carrier having at least one second fastening region is attached to the frame of the construction machine.

11. The drive assembly according to claim 1, wherein the second swivel axis is essentially parallel to the first swivel axis.

12. The drive assembly according to claim 1, wherein the at least on swivel connection region comprises at least one joint region with at least two rotational degrees of freedom.

13. The drive assembly according to claim 1, wherein the at least on swivel connection region comprises at least one joint region with at least three rotational degrees of freedom.

14. A drive assembly according to claim 1, wherein on the second functional unit carrier, at least one second fastening region is provided for attachment to a machine frame.

15. A drive assembly according to claim 1,
wherein on the second functional unit carrier, a plurality of second fastening regions are provided is provided for attachment to a machine frame.

16. The drive assembly according to claim 1, wherein the first swivel axis and the second swivel axis both extend transversely to the drive assembly.

17. A subassembly for a drive assembly, comprising:
a drive unit carrier to be attached to a drive unit;
a first functional unit carrier for a first functional unit for the drive unit, whereby the first functional unit carrier is pivotably connected to the drive unit carrier around a first swivel axis in a first swivel connection region;
a second functional unit carrier for a second functional unit for the drive unit, whereby the second functional unit carrier is pivotably connected to the first functional unit carrier around a second swivel axis in a second swivel connection region, and to the drive unit carrier in a fastening region.

18. The subassembly according to claim 17, wherein at least one swivel connection region comprises at least one joint region having at least one rotational degree of freedom.

19. The subassembly for a drive assembly according to claim 17, wherein the second functional unit carrier is pivotably connected to the first functional unit carrier in a second swivel connection region, and to the drive unit carrier in a fastening region by means of at least one elastic fastening member.

20. The subassembly according to claim 17, wherein at least one swivel connection region comprises at least one joint region having at least two rotational degree of freedom.

21. The subassembly according to claim 17, wherein at least one swivel connection region comprises at least one joint region having at least three rotational degree of freedom.

\* \* \* \* \*